United States Patent
Blank et al.

(10) Patent No.: US 8,666,847 B1
(45) Date of Patent: Mar. 4, 2014

(54) METHODS SYSTEMS AND COMPUTER PROGRAM PRODUCTS FOR MONITORING INVENTORY AND PRICES

(75) Inventors: Bennett R. Blank, San Diego, CA (US); Ryan J. Glover, Neward, CA (US)

(73) Assignee: Intuit Inc., Mountain View, CA (US)

( * ) Notice: Subject to any disclaimer, the term of this patent is extended or adjusted under 35 U.S.C. 154(b) by 377 days.

(21) Appl. No.: 13/195,822

(22) Filed: Aug. 1, 2011

(51) Int. Cl.
*G06Q 10/00* (2012.01)

(52) U.S. Cl.
USPC .............................. 705/28; 705/7.12; 705/7.29

(58) Field of Classification Search
USPC ................................. 705/28, 7.12, 7.29, 7.31
See application file for complete search history.

(56) References Cited

U.S. PATENT DOCUMENTS

| | | | |
|---|---|---|---|
| 6,006,196 A * | 12/1999 | Feigin et al. .................. | 705/7.31 |
| 6,487,540 B1 | 11/2002 | Smith et al. | |
| 6,738,749 B1 | 5/2004 | Chasko | |
| 7,398,232 B2 * | 7/2008 | Renz et al. ....................... | 705/28 |
| 7,457,766 B1 * | 11/2008 | Noble et al. .................. | 705/7.31 |
| 7,552,087 B2 | 6/2009 | Schultz et al. | |
| 7,555,476 B2 | 6/2009 | Holbrook | |
| 7,668,761 B2 * | 2/2010 | Jenkins et al. .................. | 705/28 |
| 7,792,709 B1 | 9/2010 | Trandal et al. | |
| 7,877,301 B2 * | 1/2011 | Kernodle et al. ............... | 705/28 |
| 7,987,120 B2 | 7/2011 | Shiftan et al. | |
| 8,095,439 B1 | 1/2012 | Harman et al. | |
| 8,417,572 B1 * | 4/2013 | Chenault ......................... | 705/22 |

| | | | |
|---|---|---|---|
| 2001/0029483 A1 | 10/2001 | Schultz et al. | |
| 2001/0037207 A1 | 11/2001 | Dejaeger | |
| 2002/0188499 A1 * | 12/2002 | Jenkins et al. .................. | 705/10 |
| 2003/0020762 A1 | 1/2003 | Budrys et al. | |
| 2003/0225635 A1 * | 12/2003 | Renz et al. ....................... | 705/28 |
| 2004/0220964 A1 | 11/2004 | Shiftan et al. | |
| 2004/0225567 A1 | 11/2004 | Mitchell et al. | |
| 2005/0049958 A1 | 3/2005 | Macolino | |
| 2006/0004624 A1 * | 1/2006 | Melara et al. .................. | 705/10 |
| 2006/0038003 A1 | 2/2006 | Wakasa et al. | |
| 2006/0041457 A1 * | 2/2006 | Mueller et al. ..................... | 705/7 |

(Continued)

OTHER PUBLICATIONS

Hughes, A.M., "How Panduit Did It," American Demographics, Marketing Tools Supplement, pp. 4-7, Mar./Apr. 1996.*

(Continued)

*Primary Examiner* — Nicholas D Rosen

(74) *Attorney, Agent, or Firm* — Vista IP Law Group LLP

(57) ABSTRACT

Methods, systems, and computer program products for an inventory story monitor are disclosed. In one or more embodiments, the disclosed method involves predicting a number of inventory items on a future date based at least in part upon a number of the inventory items on the current date and a rate of consumption of the inventory items, which is determined based on prior sales of the inventory items. The method also involves determining a price trend of the inventory items. In addition, the method involves determining whether to purchase the inventory items on the current date based at least in part upon the predicted number of inventory items, a rate of consumption of the inventory items, and a price trend of the inventory items. Further, the method involves displaying to the user an indicator of whether to purchase the inventory items on the current date or on a later date.

18 Claims, 14 Drawing Sheets

(56) References Cited

U.S. PATENT DOCUMENTS

| | | |
|---|---|---|
| 2006/0085298 A1* | 4/2006 | Inskeep et al. .................. 705/28 |
| 2006/0173693 A1* | 8/2006 | Arazi et al. ....................... 705/1 |
| 2006/0282346 A1* | 12/2006 | Kernodle et al. ............... 705/28 |
| 2007/0038323 A1* | 2/2007 | Slocum et al. .................. 700/99 |
| 2007/0069013 A1 | 3/2007 | Seifert et al. |
| 2007/0094087 A1 | 4/2007 | Mitchell et al. |
| 2007/0164106 A1 | 7/2007 | McDevitt et al. |
| 2007/0288322 A1 | 12/2007 | Watanabe |
| 2008/0133310 A1* | 6/2008 | Kim et al. ....................... 705/10 |
| 2009/0096590 A1 | 4/2009 | Grundelman |
| 2009/0271265 A1 | 10/2009 | Lay et al. |
| 2010/0125486 A1* | 5/2010 | Sinclair et al. .................. 705/10 |
| 2010/0125489 A1* | 5/2010 | Surendra et al. ................ 705/10 |
| 2010/0153242 A1 | 6/2010 | Preston et al. |
| 2010/0257066 A1 | 10/2010 | Jones et al. |

OTHER PUBLICATIONS

Simatupang, T.M., et al., "Applying the Theory of Constraints to Supply Chain Collaboration," Supply Chain Management, vol. 9, No. 1, pp. 57-70, 2004.*

Battersby, M.E., "Taking Stock: Maintaining Inventories Is Essential to Get the Full Picture of the Financial Health of Your Business," Gifts and Decorative Accessories, vol. 105, No. 6, p. 22, Jun. 2004.*

Office Action dated Dec. 30, 2010, Interview Summary dated Mar. 8, 2011, Amendment dated Mar. 30, 2011, Amendment dated Jun. 13, 2011 and Notice of Allowance dated Oct. 11, 2011 in U.S. Appl. No. 12/609,922, filed Aug. 21, 2009, (43 pages).

Office Action dated May 22, 2012, Interview Summary dated Aug. 20, 2012 and Amendment dated Aug. 21, 2012 in U.S. Appl. No. 13/286,101, filed Oct. 31, 2011, (54 pages).

Office Action dated Aug. 27, 2012 in U.S. Appl. No. 12/846,701, filed Jul. 29, 2010, (12 pages).

* cited by examiner

Product or Service Information

Name: [Bicycle Chains] ← 510

☐ Is sub-product/service  Why make a sub?

Track Quantity on Hand (for inventory items) ← 520

Current quantity on hand: 250.00   [date....]

Quantity on hand includes transactions dated on or after: 07/25/2001

Inventory Asset Account: [Inventory Asset : ▼]
Which account should I use?
Note: Tracking quantity on hand can't be turned off once it's turned on?

BUY LATER ← 550

[CLICK TO BUY] ← 560

Sales Information

Description on sales forms: [Bicycle Chains]

Price/Rate: [35.00]  ← 530
Price in dollars for one product or service (50 for $50/hour), or a percentage.

Income account: [Sales of Product Income ▼]
Which account should I use?

Purchasing Information

Description on purchase forms: [Bicycle Chains]

Cost: [35.00]  ← 540
Price in dollars for one product or service (50 for $50/hour)

Expense account: [Cost of Goods Sold ▼]
Which account should I use?

[Delete]            [Save] [Cancel]

[How Do I?]

FIG. 10A 1010 d, the sale price of each item;
1012 a, the acquisition cost, or cost to buy each item;
1014 s, the storage cost of the items.
1016 r, the borrowing rate of the money to purchase the inventory;
950 ndot, the average rate of inventory depletion;

FIG. 10B 1020 d = 10  sale price of each item ($)
1022 a = 8, the acquisition cost, or cost to buy each item ($)
1024 s = 100, the storage cost of the items ($).
1026 r = 0.1/365, the borrowing rate of the money to purchase the inventory;
1028 ndot =1, the average sales rate

US 8,666,847 B1

METHODS SYSTEMS AND COMPUTER PROGRAM PRODUCTS FOR MONITORING INVENTORY AND PRICES

BACKGROUND

Embodiments of the invention relate to inventory control. Business owners may pay more than they might need to when purchasing inventory items or raw materials, since they often do so in reaction to unexpected low inventories (e.g., when they run out of stock or when they receive a large order). By waiting to purchase the inventory items or raw materials until they all but have little choice to do so, businesses have less power to negotiate a good price for the items or wait until pricing fluctuations work in their favor. Consequently, business owners may pay more for inventory items than necessary. Additionally, the required inventory items or materials may not be available from a preferred vendor, or available at all, when the business needs the items. These inventory control mishaps can result in significant problems for business operations, decreased customer satisfaction, and increased business costs.

SUMMARY

Certain embodiments relate to computer-implemented methods for notifying a user about replenishment status of an inventory item. A method according to one embodiment involves receiving, at a computer, electronic data indicating a number of the inventory items purchased by a user in the past. The method further involves receiving, at the computer, electronic data indicating prior sales of the inventory items, and determining, with the computer, a number of the inventory items on a current date based on the number of inventory items purchased by the user in the past and the prior sales of the inventory items.

In addition, the method involves predicting, with the computer, a number of the inventory items on a future date based at least in part upon the number of inventory items on the current date and a rate of consumption of the inventory items determined based on the prior sales of the inventory item. Additionally, the method involves determining, with the computer, a price trend of the inventory item. Further, the method involves determining, with the computer, whether to purchase the inventory item on the current date based at least in part upon the predicted number of inventory items, a rate of consumption of the inventory items, and a price trend of the inventory items. Also, the method involves displaying to the user an indicator of whether to purchase the inventory items on the current date or on a later date.

In a single or multiple embodiments, the price trend for the inventory items is determined based at least in part upon past prices of raw materials used to manufacture the inventory items, past retail prices of the inventory items, and/or past wholesale prices of the inventory items. In at least one embodiment, the determining whether to purchase the inventory items on the current date is additionally based at least in part upon a sales trends for the inventory items. In some embodiments, the sales trends for the inventory items are based at least in part upon past seasonal sales trends for the inventory items.

In a single or multiple embodiments, the indicator includes instructions relating to buy the inventory items now, buy the inventory items later, or neutral regarding buying the inventory items. In some embodiments, the indicator is sent to the user by an electronic message sent from the computer to a computing device and/or a mobile communication device. In one or more embodiments, the indicator is displayed to the user by a real time display on a computing device and/or a mobile communication device. In some embodiments, the indicator is a visual indicator and/or an auditory indicator.

In a single or multiple embodiments, the method further comprises providing the user with a means to buy the inventory items. In at least one embodiment, the means to buy the inventory items is an actionable link to buy the inventory items. In some embodiments, the actionable link to buy the inventory items allows the user to purchase the inventory items directly from a merchant selling the inventory items. In one or more embodiments, the actionable link to buy the inventory items allows the user to purchase the inventory items from a merchant selling the inventory items via a financial institution.

In a single or multiple embodiments, the electronic data indicating the number of the inventory items purchased by the user in the past is received from a financial management system associated with the computer. In some embodiments, the electronic data indicating the number of the inventory items purchased by the user in the past is received by the financial management system from a computer of a financial institution at which the user has an account. In one or more embodiments, the electronic data indicating prior sales of the inventory items is received from a financial management system associated with the computer. In some embodiments, the electronic data indicating prior sales of the inventory items is received by the financial management system from a computer of a financial institution at which the user has an account.

In a single or multiple embodiments, disclosed is a computer program product comprising a non-transitory computer readable storage medium embodying one or more instructions executable by a computer to perform a process for notifying a user about replenishment status of an inventory item. The process involves receiving, at the computer, electronic data indicating a number of the inventory items purchased by the user in the past. Also, the process involves receiving, at the computer, electronic data indicating prior sales of the inventory items. The process further involves determining, with the computer, a number of the inventory items on a current date based on the number of inventory items purchased by the user in the past and the prior sales of the inventory items.

In addition, the process involves predicting, with the computer, a number of the inventory items on a future date based at least in part upon the number of inventory items on the current date and a rate of consumption of the inventory items determined based on the prior sales of the inventory item. Additionally, the process involves determining, with the computer, a price trend of the inventory item. In addition, the process involves determining, with the computer, whether to purchase the inventory item on the current date based at least in part upon the predicted number of inventory items, a rate of consumption of the inventory items, and a price trend of the inventory items. Further, the process involves displaying to the user an indicator of whether to purchase the inventory items on the current date or on a later date.

In a single or multiple embodiments, a system for notifying a user about a replenishment status of an inventory item is disclosed. The disclosed system involves an intermediate computer operably coupled to a source of inventory item data through a first network and operably coupled to a computing device of a user through a second network. A replenishment status program is executed on or accessible by the intermediate computer. In one or more embodiments, the replenishment status program is programmed, configured or operable to receive electronic data indicating a number of the inventory items purchased by the user in the past. The replenishment status program is also configured, programmed or operable to receive electronic data indicating prior sales of the inventory items. Also, the replenishment status program is configured, programmed or operable to determine a number of the inventory items on a current date based on the number of inventory items purchased by the user in the past and the prior sales of the inventory items.

In addition, the replenishment status program is configured to predict a number of the inventory items on a future date based at least in part upon the number of inventory items on the current date and a rate of consumption of the inventory items determined based on the prior sales of the inventory item. Additionally, the replenishment status program is configured to determine a price trend of the inventory item. Also, the replenishment status program is configured to determine whether to purchase the inventory item on the current date based at least in part upon the predicted number of inventory items, a rate of consumption of the inventory items, and a price trend of the inventory items. Further, the replenishment status program is configured to display to the user an indicator of whether to purchase the inventory items on the current date or on a later date.

The features, functions, and advantages can be achieved independently in various embodiments or may be combined in yet other embodiments.

BRIEF DESCRIPTION OF THE DRAWINGS

These and other features, aspects, and advantages of the present disclosure will become better understood with regard to the following description, appended claims, and accompanying drawings where:

FIGS. 4-7 illustrate examples of how embodiments of the disclosed systems, methods, and computer program products may be implemented, wherein FIG. 4 illustrates a products and services list containing a listing of various different inventory items according to one embodiment, FIG. 5 illustrates specific information relating to the bicycle chains item that is listed on the list of FIG. 4, FIG. 6 illustrates specific information relating to the bicycle inner tubes item that is listed on the list of FIG. 4, and FIG. 7 shows the specific click to buy options for purchasing more of the bicycle inner tubes of FIG. 6;

DETAILED DESCRIPTION OF ILLUSTRATED EMBODIMENTS

Embodiments relate to systems, methods, and computer program products for real-time monitoring inventory levels, real-time monitoring process of inventory items, and displaying data indicating whether business owner or other user such as an employee, inventory manager or other business personnel should re-stock their inventory. Such indications are displayed based at least in part upon real-time inventory levels and real-time price data so that business owners or managers can manage or maintain their inventory while not being required to rush to replenish inventory when inventory runs low or runs out, while receiving benefits of lower prices paid for inventory items. Such indications may be generated when inventory of an item is at various levels including when inventory levels are not low or the item is not immediately needed such that business owners are advised to purchase additional inventory now to take advantage of low item prices or price dips. For this purpose, a financial management system used to manage or track inventory and purchase inventory items may display a status indicator of one or a plurality of inventory items with their respective codes or indicators such as "Buy Now" or a green color, "Buy Later" or a red color, or "Neutral" or a yellow color. Thus, for example, a bicycle business may have a window or status indicator including "green" for tires, "yellow" for seats, and "red" for chains, and similar indicators for other numbers of inventory items. When the owner clicks on an indicator or goes to an order page, the owner can purchase those items again with 1-click at the price that was the basis of the purchase indicator.

Figure 1:
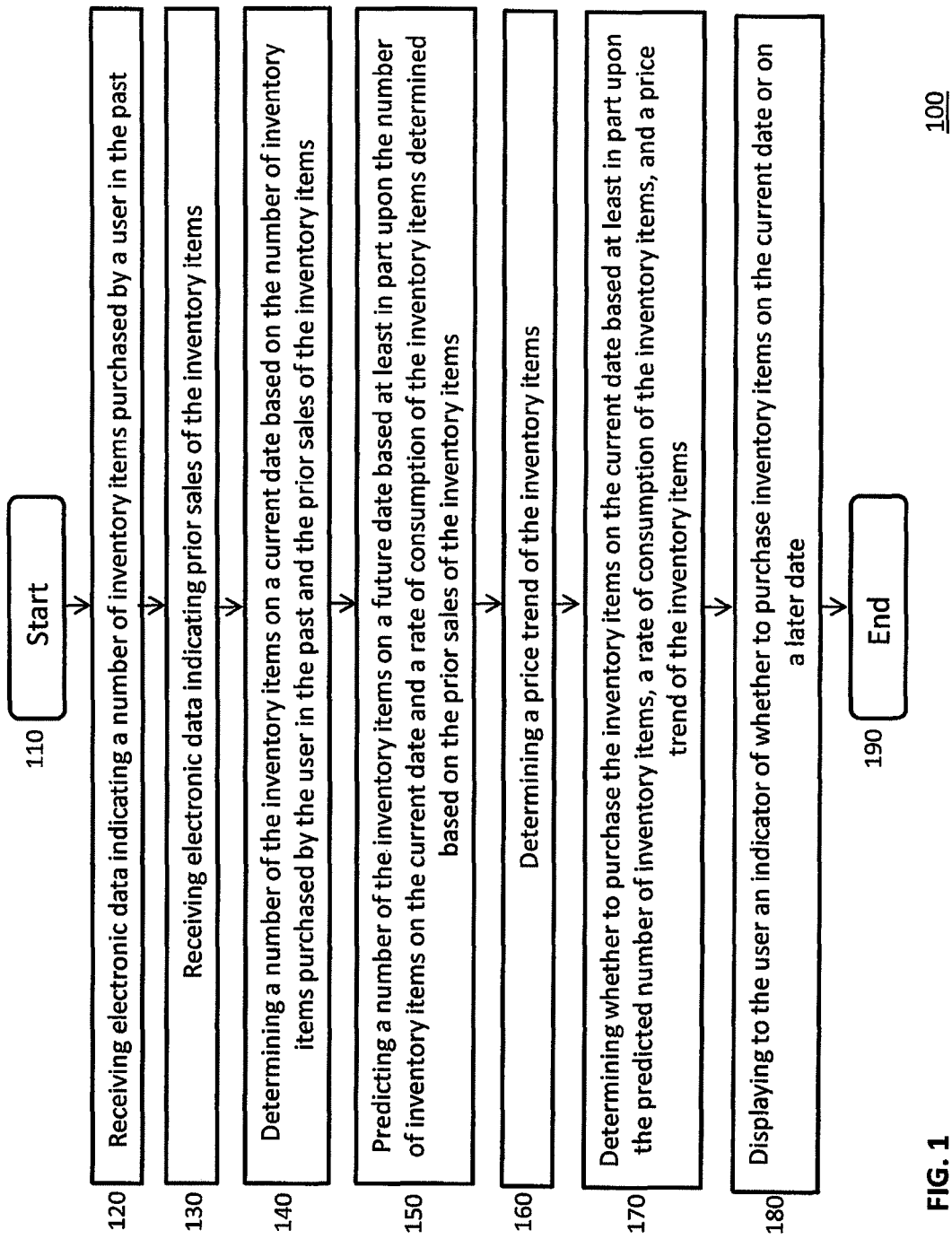
FIG. 1 is a flow chart of a method according to one embodiment for monitoring inventory data and notifying a user about replenishment status of an inventory item.

For example, referring to FIG. 1, one embodiment is directed to a method 100 for advising a business owner whether to replenish inventory based on real-time inventory and price data involves, at 110, receiving electronic data that indicates a number of inventory items purchased by the user in the past at 120. An "inventory item" is defined herein as including a good, which may be, for example, a consumer good, a raw material, a commodity, a part, or other item maintained in inventory. Then, electronic data is received that indicates prior sales of the inventory items at 130. A computer determines a number of inventory items on a current date based on the number of inventory items purchased by the user in the past and prior sales of the inventory items at 140.

The computer executes an intelligent replenishment status program to predict a number of the inventory items on a future date based at least in part upon the number of inventory items on the current date and a rate of consumption of the inventory items, which is determined based on the prior sales of the inventory items at 150. The computer also determines a price trend of the inventory items at 160.

In a single or multiple embodiments, the replenishment status program predicts a number of inventory items on a future date based at least in part upon the current inventory of the inventory items and a rate of consumption of the inventory items. The replenishment status program determines the rate of consumption of the inventory items by analyzing the data of the prior sales for those inventory items. The replenishment status program also determines the price trend for the inventory items. The replenishment status program analyzes prices for the inventory items that were listed by multiple merchants in the past in order to determine the price trend. According to at least one embodiment, the replenishment status program determines the price trend by analyzing past prices of raw materials that are used to manufacture the inventory items, past retail prices of the inventory items, and/or past wholesale prices of the inventory items.

Further, the replenishment status program determines whether the user should purchase the inventory items on the current date. The replenishment status program makes this determination by analyzing one or more or all of: the predicted number of inventory items on a future date, the rate of consumption of the inventory items, the price trend of the inventory items, the sales trend of the inventory items, the user's ability to purchase the inventory items (i.e. the user's cash position), future projects/contracts of the user that will utilize the inventory items, stock trends of the manufacturers of the inventory items, stock trends of the providers of the raw materials of the inventory items, years the user has been in business and overall industry sales trends. In at least one embodiment, the replenishment program determines the sales trend of the inventory items. In order to determine the sales trend of the inventory items, the replenishment status program analyzes the data of prior sales of the inventory items over past seasons (i.e. the seasonal sales data of the inventory items).

After the computer has determined the price trend of the inventory items, the computer determines, using the replenishment status program, whether to purchase the inventory items on the current date based at least in part upon the predicated number of inventory items, a rate of consumption of the inventory items, and a price trend of the inventory items at 170. After the computer determines whether to purchase the inventory items, an indicator is displayed to the user that indicates whether to purchase the inventory items on the current date or on a later date at 180. Further aspects of systems and methods for monitoring inventory and generating inventory alerts according to embodiments are described with reference to FIGS. 2A-11. System configurations and components that may generate, transmit, store, retrieve, receive, manage or update inventory data are described with reference to FIGS. 2A-C, and inventory management methods and associated user interfaces and actions provided by embodiments are described with reference to FIGS. 3-10.

Figure 2A:
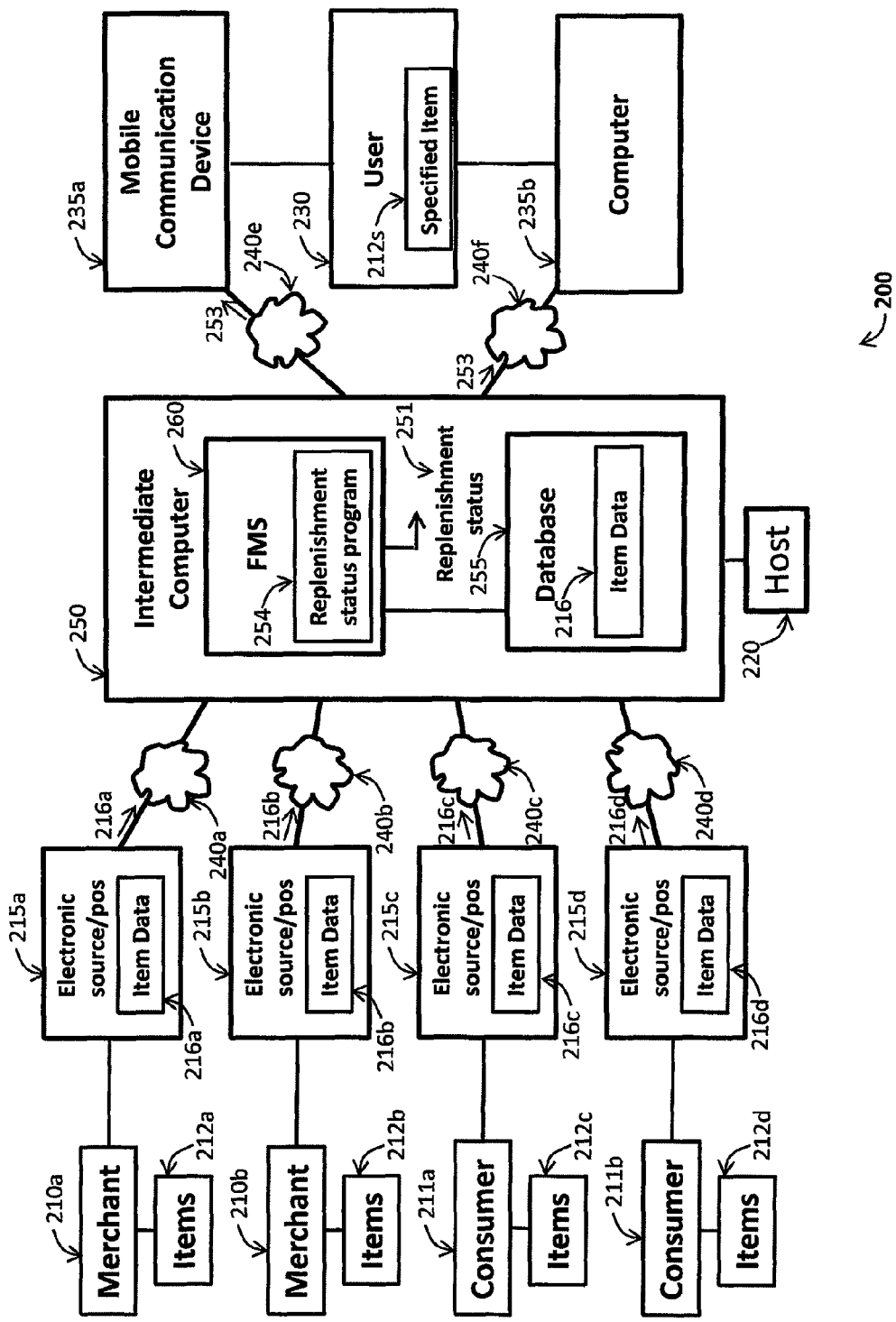
FIG. 2A is a diagram of a system constructed according to one embodiment for receiving and monitoring inventory data and notifying a user about replenishment status of an inventory item, in which an intermediate computer hosts a financial management system in the form of or including an inventory item data collection or monitoring system that may be in communication with merchant computing devices and user computing devices to receive electronic data related to the inventory item and to generate inventory alerts that are displayed or transmitted to the user.

Referring to FIG. 2A, a system 200 constructed according to one embodiment for identifying inventory item replenishment status comprises or involves one or more merchants 210a-b (generally, merchant 210) who offer various inventory items 212a-b (generally, inventory item 212) for sale to a business or user 230, consumers 211a-b (generally, consumer 211) who purchase various items 212 or products embodiment items 212 from the business owner or user 230 of embodiments, and a host 220 who collects data from merchants 210 and/or provides a financial management system (FMS) 260 for use by the business owner or user 230 to manage business matters including inventory management. The user 230 may be a business, owner of a business, or a manager, employee or other business personnel that manages inventory. For ease of explanation, reference is made generally to a business 230 or user 230 of a FMS 260.

FIG. 2A illustrates multiple merchants 210 and multiple consumers 211 that utilize respective electronic or computing devices or sources 215a-d (generally, electronic source 215) of electronic data, e.g., electronic transaction data 216a-d (generally, 216). For example, a business owner 230 may purchase inventory items 212 from a merchant 210, and those transactions can be processed by an electronic source or payment device 215 such as a Point of Sale (POS) payment terminal, a cash register, a computer, and a scanner system utilized by merchant 210.

Similarly, a consumer 211 may purchase items 212 or products embodiment items 212 from the business owner 230 using an electronic source or payment device 215 such as a POS payment terminal or cash register (e.g., when the consumer 211 is shopping at the business owner's store location), or a computer utilized to make an on-line purchase from the business 230. Electronic transaction data 216a-d is generated by electronic source 215, and represents each purchase or sale of the specific item 212s. While FIG. 2A illustrates two merchants 210a-b and two consumers 211a-b, embodiments may involve one or multiple merchants 210, may involve different or the same merchants 210 (e.g., the same store at different locations), and may involve one or multiple consumers 211.

Electronic transaction data 216 (generally, electronic data 216) identifies a specific, particular item 212s purchased or sold by user 230 (e.g., a particular type of bicycle part such as bicycle inner tubes or other specified inventory item or assembly of items). Electronic transaction data 216 that specifically identifies an item may include various types of identifications including, but not limited to, the name of the item and the item number. Electronic transaction data 216 will also include the price the item was sold or purchased by the user 230.

In the illustrated embodiment, electronic sources 215 such as POS payment terminals are operably coupled to or in communication with intermediate computer 250 managed by host 220, an example of which is Intuit Inc. Intermediate computer 250 is operably coupled to a user device such as a mobile communication device 235a (e.g., a cellular telephone, Smartphone, or other mobile device capable of cellular or wireless communications) and/or a computer 235b (such as a desktop, laptop home or office computer, or tablet computing device capable of communicating with intermediate computer 250 wirelessly or through a wire connection). For ease of explanation, reference is made generally to computing device 235 of user 230.

Electronic sources 215a-d are operably coupled to or in communication with intermediate computer 250 through respective networks 240a-d, and intermediate computer 250 is operably coupled to or in communication with one or more of user computing devices 235a, 235b through respective networks 240e-f. Examples of networks 240a-f (generally, 240) that may be utilized for communications between system 200 components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 240 generally, but various networks, combinations of networks and communication systems, methods and protocols may be utilized in embodiments.

According to embodiments, host computer 250 includes or accesses a replenishment status program 254 and a database 255 that are cooperatively operable to aggregate and store electronic transaction data 216 received from electronic sources 215. Replenishment status program 254 receives or accesses electronic transaction data 216 from electronic sources 215 or collected by various different means and stored in database 255. Replenishment status program 254 comprises instructions which, when executed, analyze electronic transaction data 216, among other types of data related to the specific item 212s, to determine the replenishment status 251 for specific item 212s. Replenishment status program 254 is also operable to establish communication with user computing device 235 regarding the replenishment status 251.

Replenishment status program 254 may be a stand-alone program or, in the embodiment illustrated in FIG. 2A, a program or module of a FMS 260. According to one embodiment, the replenishment status program 254 is a component or module of a FMS 260 in the form of an accounting program such as QUICKBOOKS, available from Intuit Inc., or a component or module of, or in communication with, another FMS that may be utilized or adapted for use in tracking items purchased, monitoring consumption of items and/or sales of items such as QUICKRECIEPTS, QUICKEN or MINT. For ease of explanation, reference is made to QUICKBOOKS as one example of a FMS 260 that utilizes or embodies a replenishment status program 254 according to embodiments.

Thus, the FMS 260 is an business accounting or inventory control program or system that allows the user 230 to manage inventory and one or more additional business-related matters such as payroll and sales, such that embodiments may be utilized to track purchases and sales of inventory items and to remind office or inventory managers to re-order certain inventory items. A FMS 260 may receive inventory and/or sales data that is generated and managed internally within a business and/or the FMS 260 may receive sales data in the form of electronic transaction data that shows item purchases from merchants 210 and sales to consumers 211 to determine inventory levels.

In this manner, the term FMS 260 is defined to include, any computing system implemented, on-line or web-based, system, package, program, module, or application that gathers financial data, has the capability to receive or retrieve financial data including electronic transaction data and/or inventory data, analyze and categorize at least part of the data into various reports or displays that are provided to user 230, and provides user 230 with the capability to conduct, and/or monitor, financial transactions. Types of financial management systems 260 include, but are not limited to any of the following: an on-line, or web-based, or computing system implemented receipt collection FMS, package, program, module, or application, accounting systems, asset management systems, business inventory systems, business accounting systems, a business FMS, and data management system as discussed herein, and/or as known in the art at the time of filing, and/or as developed after the time of filing.

Figure 2B:
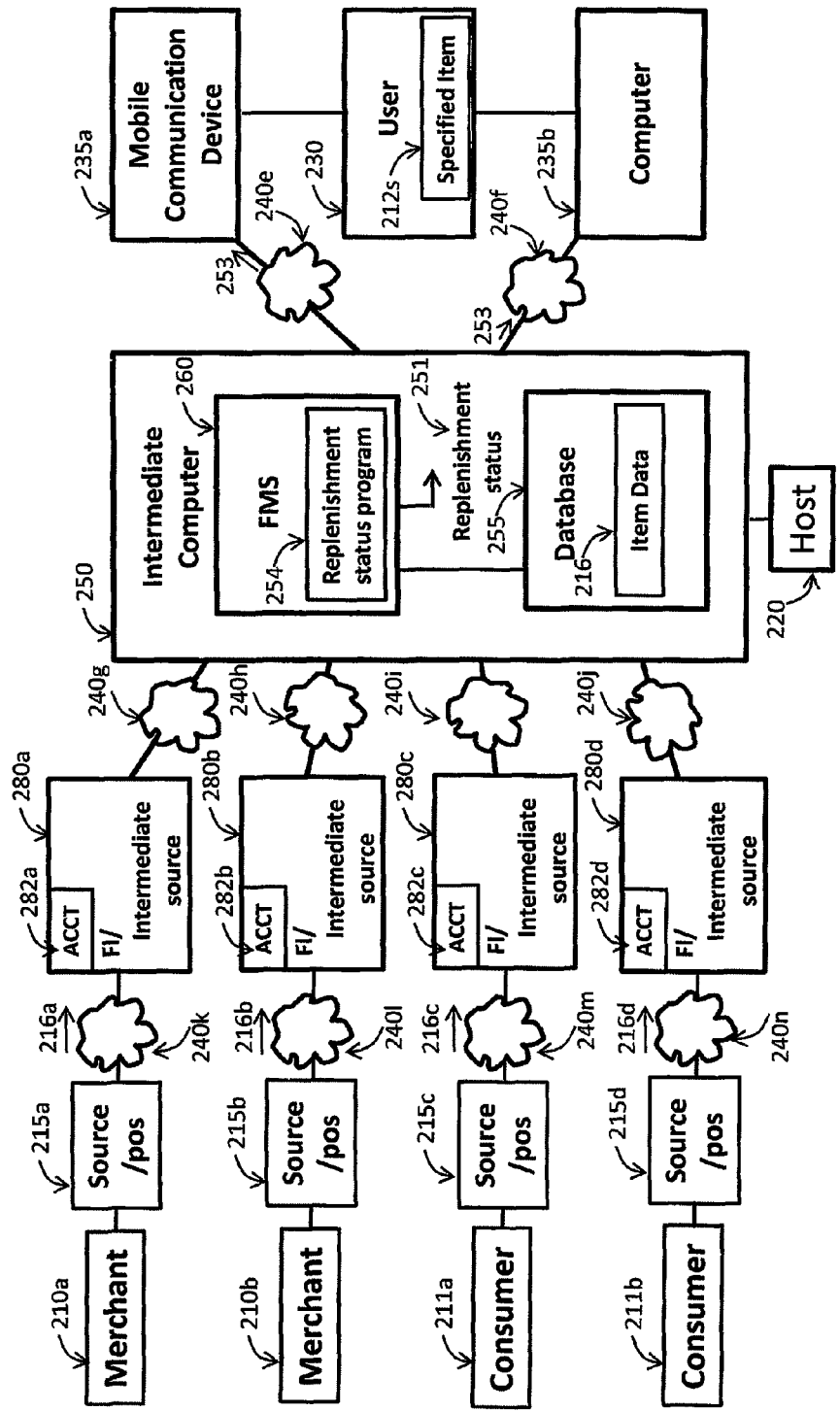
FIG. 2B is a diagram of a system constructed according to one embodiment for receiving and monitoring inventory data and notifying a user about replenishment status of an inventory item, in which an intermediate computer hosts a financial management system in the form of or including an inventory item data collection or monitoring system that may be in communication with an intermediate source of item or inventory data and user computer devices to receive electronic data related to the inventory item and to generate inventory alerts that are displayed or transmitted to the user.

In one embodiment, referring to FIG. 2B, replenishment status program 254 is operably coupled to or in communication with computers of financial institutions 280a-d (generally, 280, and shown as "FI" in FIG. 2B) through respective networks 240g-j, and financial institutions 280 are operably coupled to or in communication with electronic sources 215 through respective networks 240k-n. User 230 has accounts respective 282a-d (generally, 282) including respective transaction data 216a-d at respective financial institutions 280a-d (FIs). Thus, rather than receiving transaction data from an electronic payment device 215, such data is received from an account 282 at a FI such as a bank, credit card company or other financial institution 280 at which user 230 has an account 282 such as a checking, savings or credit card account including electronic transaction data 216.

Figure 2C:
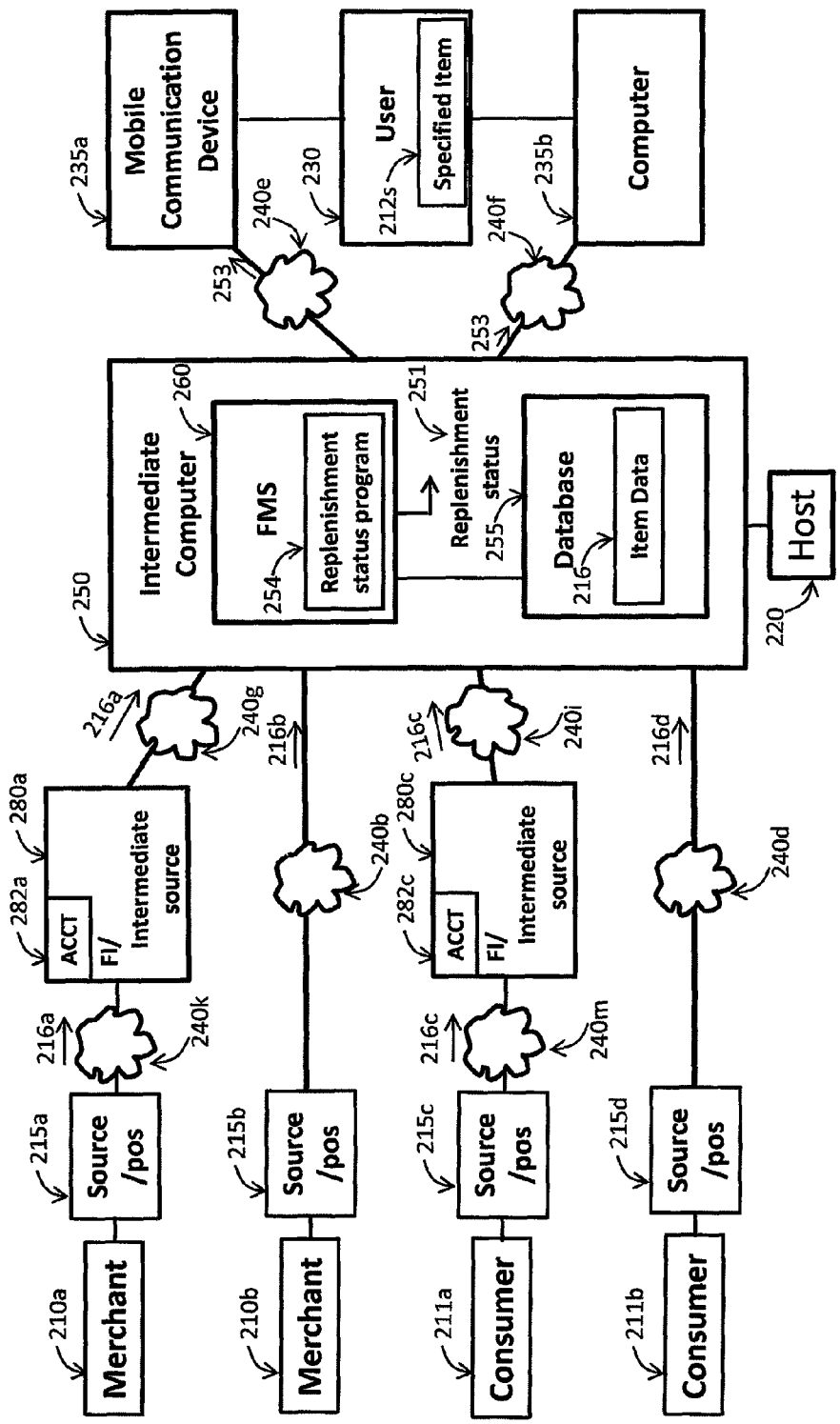
FIG. 2C is a diagram of a system constructed according to one embodiment for receiving and monitoring inventory data and notifying a user about replenishment status of an inventory item, in which an intermediate computer hosts a financial management system in the form of or including an inventory item data collection or monitoring system that may be in communication with merchant computing devices, an intermediate source of item or inventory data and a user computer to receive electronic data related to the inventory item and to generate inventory alerts that are displayed or transmitted to the user.

FIG. 2C further illustrates another system configuration in which electronic transaction data 216 is received both from an originator of the data (as shown in FIG. 2A) and through an intermediate computer or source, e.g., using a FMS 260 that is configured to receive transaction data 216 from merchants 210, consumers 211, and from accounts 282 at FIs 280.

In view of the components described with reference to FIGS. 2A-C, it will be understood that electronic data 216 indicates a number of the inventory items 212 purchased by a user 230 in the past and the electronic data 216 indicating prior sales of the inventory items 212. Further, electronic data 216 may be generated by and received from one or multiple sources, which may be the same type or different types of sources.

For example, in various embodiments, the sources are different stores of the same merchant 210, different merchants 210, different consumers 211 of the inventory items 212, a FMS 260 or other system that collects electronic data from participating merchants 210 and/or that accesses consumer 211 accounts to receive or retrieve such data, a merchant 210 and a FI 280, a merchant 210 and a FMS 260, a FMS 260 and a FI 280, and other combinations and sources of electronic data 216.

As an example, electronic data 216 is received from a first source such as a first merchant 210 having a first electronic payment device 215 and from whom the user 230 purchased an item 212, and from a second source such as a second merchant 210 having a second electronic payment device 215 and from whom the user 230 purchased the same item 212. This data may be collected by a FMS 260 that is operably coupled to or in communication with electronic payment devices 215 of merchants 120. As another example, at least one of the sources may be a FI 280 that processed a transaction involving the merchant 210 and user 230 and has electronic transaction data 216, e.g., if the user 230 paid for an item using a FI debit or credit card. This data may be collected or accessed by the FMS 260 that is operably coupled to or in communication with user accounts such as savings, checking, credit card, and other types of accounts at various FIs 280.

Further, a user 230 may generate, receive (e.g., from a separate inventory database), provide or manually enter electronic data 216 based on sales records or that is read from a paper or electronic receipt or electronic mail message. Electronic transaction data 216 may be generated by the user typing in the data by hand using the FMS 260, which is then analyzed by the replenishment status program 254 to determine the current inventory of the specific inventory items 212. The replenishment status program 254 can use purchase data and sales data of specific items 212 in order to determine the current inventory for the specific items 212. Text recognition may also be utilized to determine the details of a paper receipt or a copy or photograph of the receipt using Optical Character Recognition (OCR) or another suitable method.

As a further example, electronic data 216 could originate from, or be based at least in part upon one or more of electronic data of current inventory, electronic data of sales reducing inventory, and electronic transaction data (such as item-level electronic transaction data received from merchant for purchase of particular inventory item).

For ease of explanation, reference is made to "electronic data" 216 indicating current inventory and/or sales for a particular inventory item 212s. However, it will be understood that electronic data 216 may be generated by the user 230 or another party such as a merchant 210 or FI 280, and received from an internal source of user 230 or an external source such as a merchant computer or FI computer.

Figure 3:
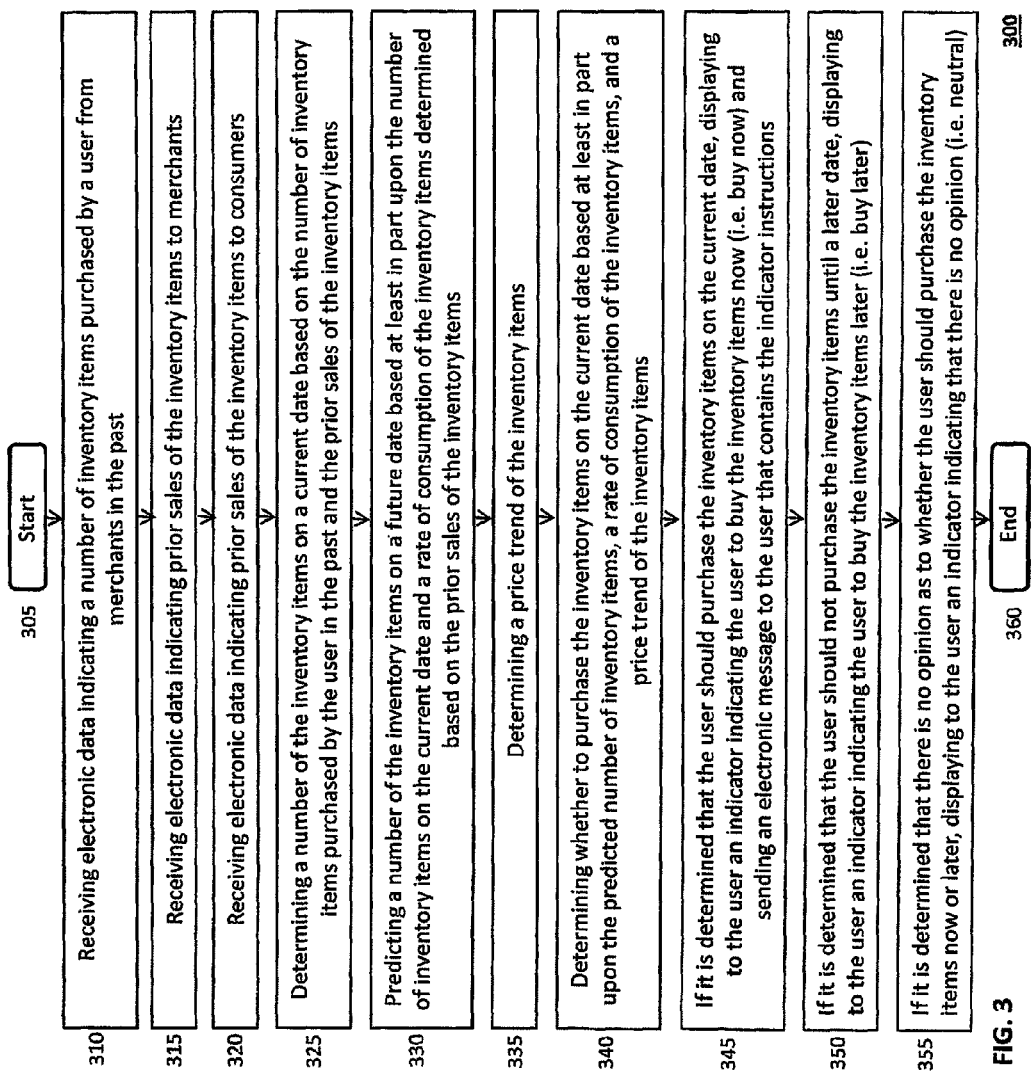
FIG. 3 is a flow chart of a detailed method of one embodiment for notifying a user about replenishment status of an inventory item.

With continuing reference to FIG. 2A and with further reference to FIG. 3, one embodiment of a method 300 is directed to determining replenishment status 251 of specific inventory item 212s, and for communicating with user 230 the replenishment status 251 and may be implemented using system components and/or other inventory-related computers or systems as shown in FIGS. 2A-C.

At the start 305 of the method, intermediate computer 250 receives from electronic sources 215a-b via networks 240a-b electronic item data 216a-b indicating a number of specific inventory items 212s purchased by user 230 from merchants 210a-b in the past 310. Intermediate computer 250 also receives from electronic sources 215a-b via networks 240a-b electronic item data 216a-b indicating a number of specific inventory items 212s sold by user 230 to merchants 210a-b in the past 315. In addition, intermediate computer 250 receives from electronic sources 215c-d via networks 240c-d electronic item data 216c-d indicating a number of specific inventory items 212s sold by user 230 to consumers 211a-b in the past 320. The intermediate computer 250 stores item data 216a-d in database 255.

Intermediate computer 250 uses item data 216a-d to determine a number of the inventory items 212s on a current date based on the number of inventory items 212s purchased by user 230 in the past and the prior sales of the inventory items 212s to the merchants 210 and to the consumers 211, 325. After the intermediate computer 250 determines the number of the inventory items 212s on the current date, the intermediate computer 250 executes replenishment status program 254 that uses item data 216a-d to predict a number of the inventory items 212s on a future date based at least in part upon the number of inventory items 212s on the current date and a rate of consumption of the inventory items 212s, which is determined based on the prior sales of the inventory items 212s, 330. Intermediate computer 250 executes replenishment status program 254 that uses item data 216a-b to determine a price trend of the inventory items 212s.

Intermediate computer 250 then executes replenishment status program 254 to determine whether user 230 should purchase the inventory items 212s on the current date based at least in part upon the predicted number of inventory items 212s, the rate of consumption of the inventory items 212s, and the price trend of the inventory items 212s, 340. If intermediate computer 250 determines that user 230 should purchase the inventory items 212s on the current date, intermediate computer 250 displays to user 230 in real time an indicator (i.e. indicating the replenishment status 251) indicating to the user 230 to buy the inventory items 212s now (i.e. buy now), and sends to a mobile communication device 235a and/or a computer 235b associated with user 230 an electronic message via network 240e-f, where the electronic message contains the indicator instructions 345.

However, if intermediate computer 250 determines that user 230 should not purchase the inventory items 212s until a later date, intermediate computer 250 displays to user 230 in real time an indicator (i.e. indicating the replenishment status 251) indicating to the user 230 not to buy the inventory items 212s until a later date (i.e. buy later) 350. Conversely, if intermediate computer 250 determines that there is no opinion as to whether the user 230 should purchase the inventory items 212s now or at a later date, intermediate computer 250 displays to user 230 in real time an indicator (i.e. indicating the replenishment status 251) indicating to the user 230 that there is no opinion (i.e. neutral) 355. After intermediate computer 250 displays the indicator to the user, the method 300 ends 360.

In a single or multiple embodiments, the replenishment status program displays an indicator to the user regarding the inventory status. In particular, the indicator indicates whether the user should purchase the specific inventory items on the current date or simply wait to a later date to purchase the items. The indicator can be displayed to the user, e.g., when the user accesses the intermediate computer to use the replenishment status program or to use a FMS that includes the replenishment status program or when the user logs onto a FMS. In this case, the indicator is displayed real time on the user's computing device and/or on the user's mobile communication device. In at least one embodiment, the indicator contains instructions including, but not limited to, whether the user should purchase the specific inventory items on the current date (e.g., buy now), whether the user should purchase the specific inventory items at a later date (e.g., buy later), and whether there is no opinion as to whether the user should purchase the inventory items (e.g., neutral). The indicator may be displayed as a visual indicator, which contains the specific textual instructions, and/or may be an auditory indicator, which verbally speaks the specific instructions. In some embodiments, the indicator may be displayed to include a specific color. For example, the "buy now" indicator instructions may be hi-lighted in red to alert the user to purchase the inventory items, the "buy later" indicator instructions may be hi-lighted in green, and the "neutral" indicator instructions may be hi-lighted in yellow.

In a single or multiple embodiments, a user is notified of the inventory status generated by the inventory status program by an electronic message such as an electronic mail (e-mail), text or Short Message Service (SMS) or other message sent from the intermediate computer to a mobile communication device and/or computing device of the user. The inventory status may be an indicator that includes specific instructions to the user regarding whether the user should purchase the one or multiple types of specific inventory items on the current date or simply wait to a later date to purchase the items.

In a single or multiple embodiments, one or more actionable buttons and/or links is displayed to the user to purchase the inventory items (e.g., a "click to buy" button). By depressing the button(s) or by clicking on the link(s), the user is able to purchase the inventory items though a one-click operation. These actionable buttons or links can be displayed next to the inventory status indicators. In one or more embodiments, one or more actionable buttons and/or links is contained in the inventory status electronic message that is sent to the user. For these embodiments, when the user depresses the button(s) or clicks on the link(s) in the electronic message, a one-click purchase webpage will appear that will allow for the user to proceed with the purchase of specific inventory items that are related to the link. If the user does not wish to purchase any inventory items, the electronic message can simply be ignored.

Figure 4:
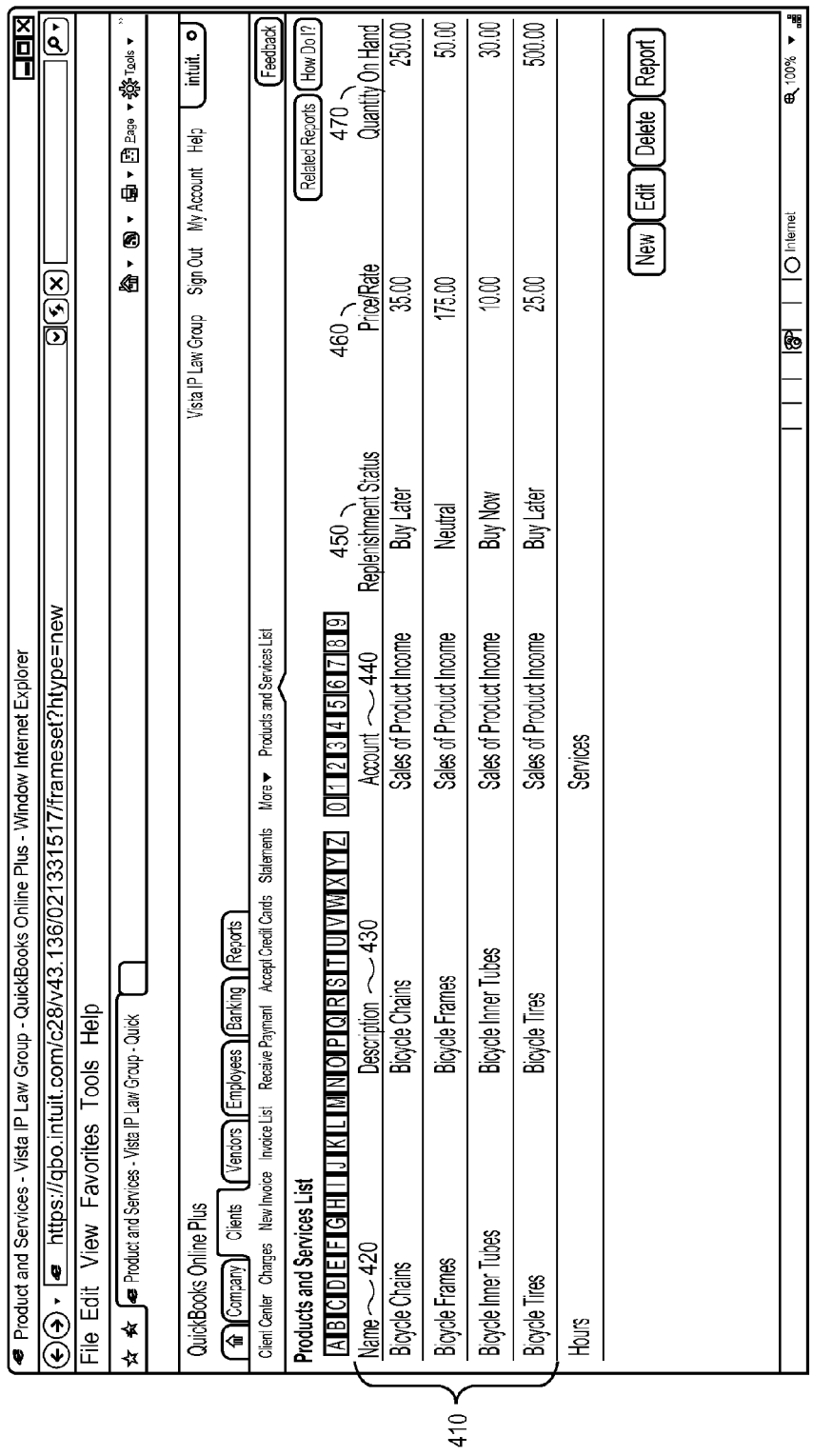

For example, referring to FIG. 4, in one embodiment, a products and services list 400 containing a listing of various different inventory items 212s of user 230 is shown. This list 400 contains five columns of data relating to the different inventory items 212s. The columns of data are: the inventory item name 420, the inventory item description 430, the account used for the inventory item 440, the replenishment status of the inventory item 450, the price per inventory item unit 460, and the quantity on hand of the specific inventory item 470. As an example, for the data relating to the bicycle chains inventory items, user 230 has 250 bicycle chains on hand, and the replenishment status is set to "buy later". It should be noted that the "buy later" indicator is hi-lighted in green so as to not alert user 230. In another example, for the data relating to bicycle inner tubes inventory items, user 230 only has 30 bicycle inner tubes on hand, and the replenishment status is set to "buy now", which is hi-lighted in red to alert user 230 to purchase more bicycle inner tubes. It will be understood that other color and/or other indicators may be utilized for this purpose.

When user 230 clicks on the bicycle chains name 420 in the listing 400, a page containing specific information 500 relating to the bicycle chains inventory items is displayed to user 230. This page containing the specific information 500 relating to the bicycle chains inventory items is shown in FIG. 5. The specific information 500 includes the name of the inventory items (i.e. bicycle chains) 510, the current quantity on hand of the bicycle chains inventory items 520, the price user 230 sells per unit 530, and the price user 230 spends to purchase a unit 540. Also shown is the replenishment status indicator 550, which is located in the upper-right hand corner of the specific information page 500. The indicator 550 indicates "buy later" and is hi-lighted in green. The "buy later" indicator indicates to user 230 to purchase more bicycle chains at a later date. Just below the indicator 550, is a "click to buy" button 560. The "click to buy" button 560 gives user 230 the option to easily purchase more bicycle chains regardless of the current instructions of the indicator 550.

Figure 6:
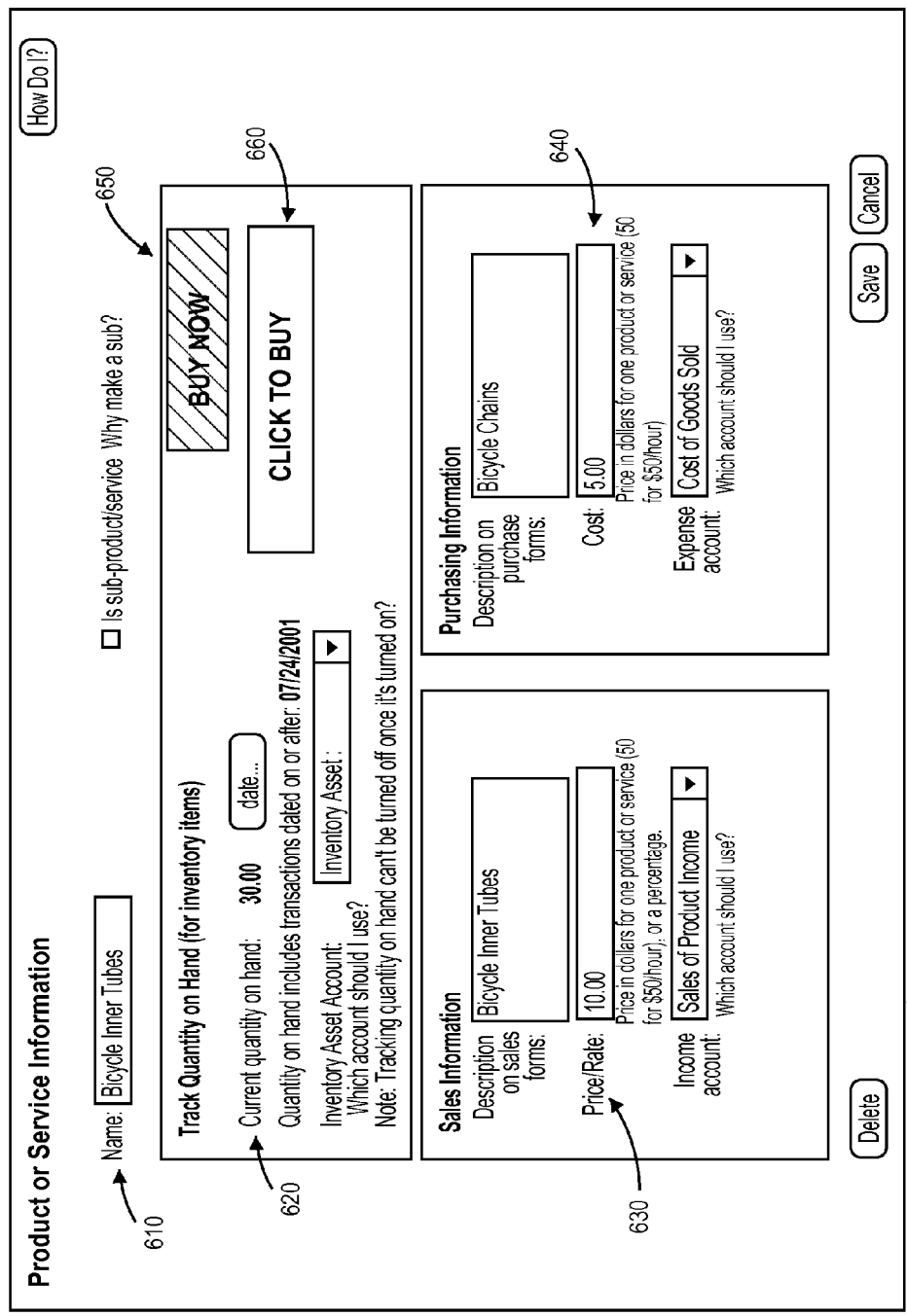
Figure 7:
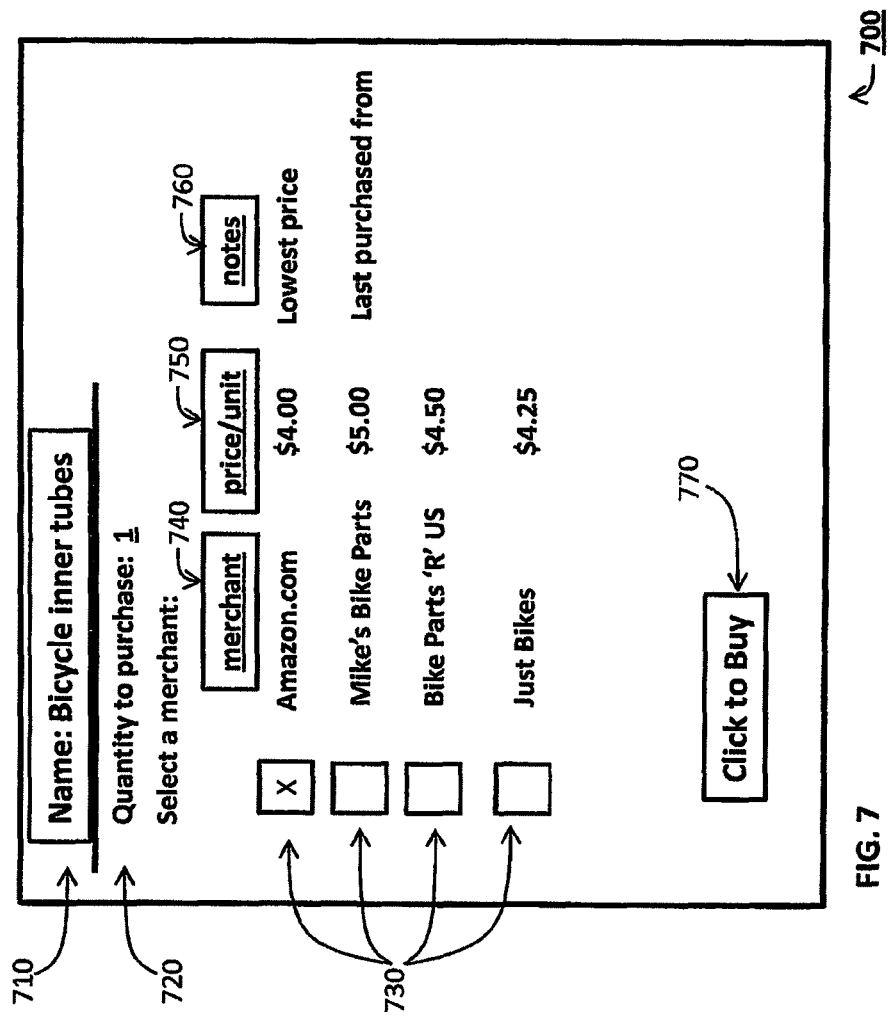

In another example, when user 230 clicks on the bicycle inner tubes name 420 in the listing 400 of FIG. 4, a page containing specific information 600 relating to bicycle inner tubes is displayed to user 230. FIG. 6 shows this page containing the specific information 600 relating to the bicycle inner tubes inventory items. In this page 600, the specific information 600 includes the name of the inventory items (i.e. bicycle inner tubes) 610, the current quantity on hand of the bicycle inner tubes inventory items 620, the price user 230 sells per unit 630, and the price user 230 spends to purchase a unit 640. The replenishment status indicator 650 indicates "buy now" and is hi-lighted in red to alert user 230. The "buy now" indicator indicates to user 230 to purchase more bicycle chains now. The "click to buy" button 660 gives user 230 the option to easily purchase more bicycle inner tubes.

When user 230 depresses the "click to buy" button 660, a page containing specific purchasing options 700 relating to the bicycle inner tubes is displayed to user 230. On this page 700, the name of the bicycle inner tubes inventory items 710 is shown in the upper-left hand corner, and a listing of merchants 740 currently selling the bicycle inner tubes inventory items is also shown. Replenishment status program 254 is automatically executed on intermediate computer 250 in order to obtain the listing of merchants who are currently selling the bicycle inner tubes inventory items. Replenishment status program 254 generates this listing of merchants 740 by analyzing data from a wide variety of merchants. The receiving or acquiring of the merchant data by the replenishment status program 254 may involve Open Financial Exchange (OFX), screen scraping, application program interfaces (APIs), and manual user entry depending on how the FMS 260 is configured.

The listing of merchants 740 contains information relating to the names of the merchants 740, the price per unit 750 that each of the merchants is selling the bicycle inner tubes for, and information 760 relating to which merchant has the lowest price per unit and which merchant the user 230 last purchased bicycle inner tubes from. As can be seen from this example listing of merchants 740, merchant Amazon.com has the lowest price per unit and Mike's Bike Parts is the merchant from whom the user 230 last purchased bicycle inner tubes.

The specific purchasing options presented to user 230 on this page 700 are the quantity of bicycle inner tubes to purchase 720, and the specific merchant to purchase the bicycle inner tubes. The quantity to purchase 720 is set to a default value of one (1), and the default merchant selected (i.e. as indicated by the checked box 730) to purchase the bicycle inner tubes from is the merchant having the lowest price per unit. Prior to depressing the "click to buy" button 770 on this page 700, the user 230 may choose to change either or both of these default purchasing options. Once user 230 is satisfied with the purchasing options that are selected, user 230 only needs to depress the "click to buy" button 770 once in order to complete the purchasing transaction.

The methodology for determining the replenishment status of inventory items that maximizes net profit for the user is very flexible, and can account for the business of the user. The replenishment status program can use various parameters or factors for determining the replenishment status of specific inventory items. Types of parameters or factors that can be used by the replenishment status program include, but are not limited to, purchasing the inventory at the lowest price, the ability of the user to negotiate with lenders for the lowest borrowing rate, assessing the ability of competition to arrive at an inventory sale price, obtaining an estimate of the inventory sale rate by analyzing past sales history and other vendor data, and assessing storage costs. Other expenses can also readily be incorporated into the model and analysis, such as variations in the sales rate, the number of personnel required to manage the inventory, inventory insurance costs, variations in storage costs with inventory size, and inventory storage limits.

Figure 8:
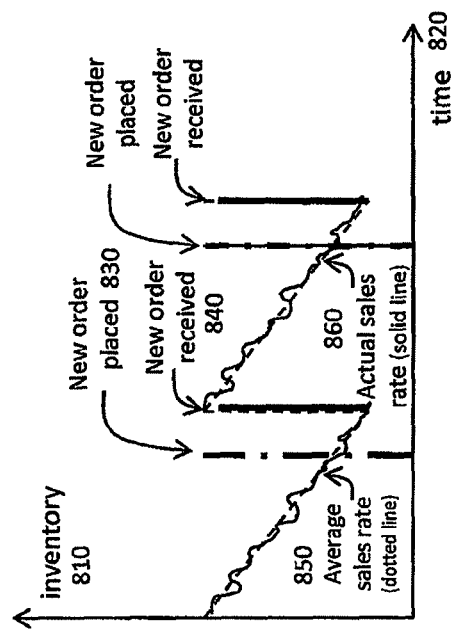
FIG. 8 is a graph illustrating an example of how the consumption and replenishment of the inventory items varies over time, in accordance with at least one embodiment.

FIG. 8 is a graph illustrating an example of how the consumption and replenishment of the inventory items varies over time. In particular, the graph shows the amount of inventory stored (i.e. the vertical axis 810 shows the amount of inventory items on hand) as a function of time (i.e. the horizontal axis 820 depicts the passage of time). The graph shows that when a new order is placed 830 and then the inventory items are received 840, the inventory increases abruptly. As the inventory items are sold over time, the inventory decreases at an average rate (ndot) 850 (i.e. shown by the dotted line), and by an actual rate 860 (i.e. shown by the solid wavy line) over an interval of time. Inventory management attempts to minimize excess inventory without allowing the inventory to go to zero. This is especially important when supplying manufacturers. As such, for inventory management, the statistical variations in the inventory sales rate due to seasonal variations, production rates, weather, and other factors must be taken into consideration.

Figure 9:
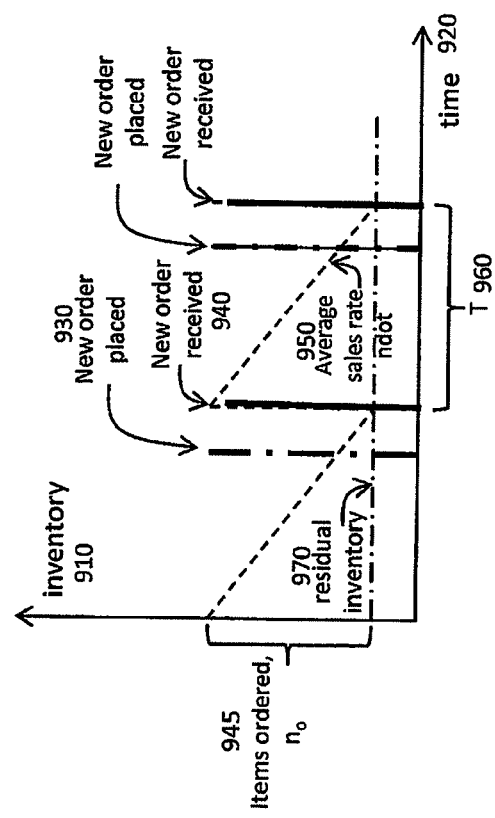
FIG. 9 is a graph illustrating the average of the inventory consumption rate of the inventory items of FIG. 8, in accordance with at least one embodiment.
Figure 10:
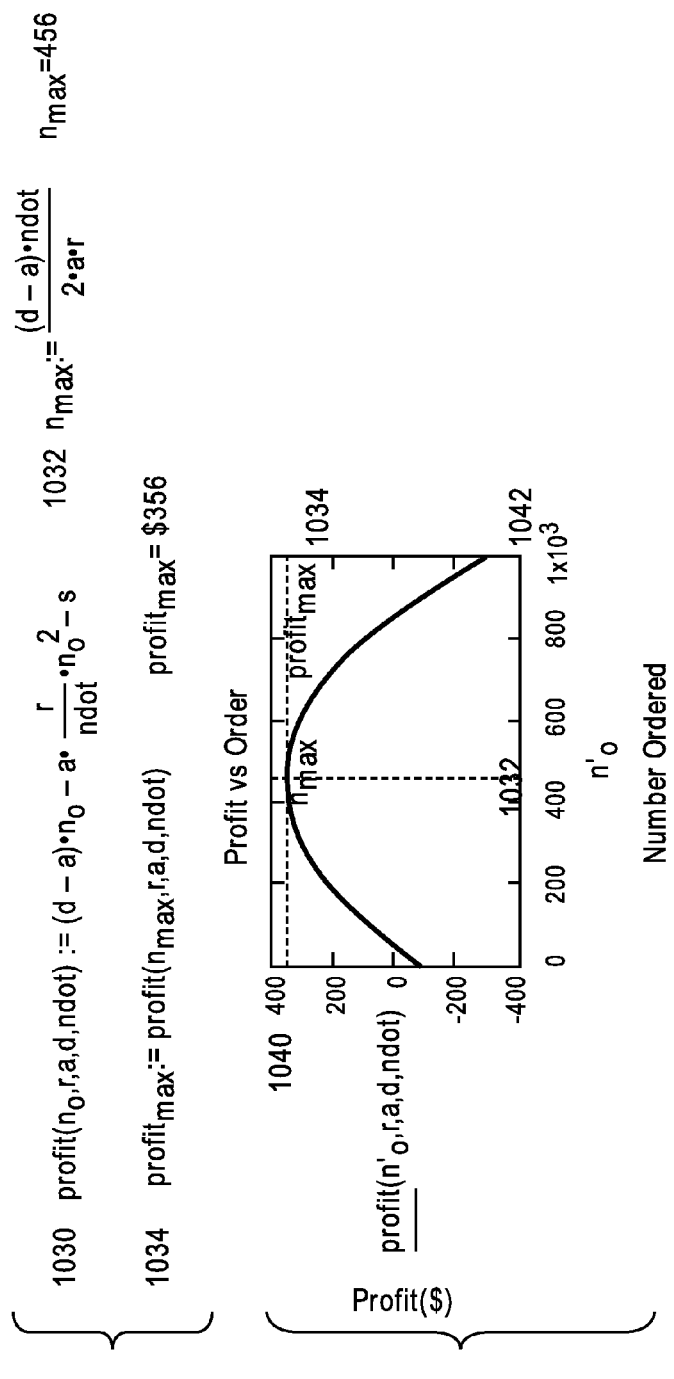
FIGS. 10A-D illustrate examples of how embodiments may be implemented and calculations that can be performed by the replenishment status program to determine whether the user should purchase the inventory items on the current date.

FIG. 9 is a graph illustrating the average of the inventory consumption rate of the inventory items of FIG. 8. In this figure, the vertical axis 910 shows the amount of inventory items on hand, and the horizontal axis 920 depicts the passage of time. When a new order for $n_o$ items is placed 930 and then received 940, the inventory increases by $n_o$ 945. As the items are sold over time, the inventory decreases at an average rate (ndot) 950 over an interval of time T 960 by the amount purchased $n_o$ 945. It should be noted that a threshold amount of remaining inventory 970 is automatically maintained (e.g., 10 units of the inventory items) so as to ensure that the inventory is not allowed to go to zero.

FIGS. 10A, 10B, 10C, and 10D, when viewed together, show an example of the calculations the replenishment status program performs to determine whether the user should purchase the inventory items on the current date in order for the user to maximize his profits. The amount of inventory a user purchases that maximizes his profits depends upon a number of factors. Primarily these factors include sale price of each item (d) 1010, cost to buy each item (a) 1012, storage costs (s) 1014, and cost to borrow the money to buy the items (r) 1016. These factors are shown in FIG. 10A. The replenishment status program first assesses what the current items can sell for (d) 1010 by surveying data from merchants. Then, the replenishment program determines the cost of each item (a) 1012 by surveying different suppliers and merchants. The inventory expenses include not only the cost of the items, but also the cost to store the items (s) 1014 as well as the rate (r) 1016 to borrow the money for their purchase. The replenishment status program also estimates the expected inventory sales rate (ndot) 950 based on previous sales history, other vendors experience, and seasonal factors. After determining the sale price, cost of each item, storage cost, borrowing rates, and estimating the sales rate, the replenishment status program can calculate the number of items to purchase that will maximize the user's profit.

FIG. 10B provides, as an illustrative example, values for sale price (d) 1020, cost of each item (a) 1022, storage cost (s) 1024, borrowing rate (r) 1026, and estimated sales rate (ndot) 1028 to calculate the amount of inventory to purchase that maximizes the net profit. The net profit is equal to p−b−s, where p is the gross profit, b is the cost of borrowing the money for the inventory purchase, and s is the storage cost. The gross profit is equal to $(d-a)n_o$. It is the difference between the item sale price d and the item cost a multiplied by the number of items purchased $n_o$. The total cost of the inventory is equal to $c=an_o$. The cost of borrowing over the time T 960 is equal to b=crT, where r is the borrowing rate and T is the time required to sell the inventory. From FIG. 9, the time to sell the inventory is equal to T=no/ndot, as such b=a $(r/ndot)n_o^2$. FIG. 10C provides the formulas for the net profit 1030, number of inventory items $n_o$ to order to maximize the net profit ($n_{max}$) 1032, and the resultant maximum profit (profit$_{max}$) 1034. FIG. 10D shows a graph with the vertical axis 1040 showing the amount of profit, and the horizontal axis 1042 showing the number of items ordered n'$_o$. From this graph, the maximum profit (profit$_{max}$) 1034 is shown to be obtained by ordering $n_{max}$ items 1032.

Figure 11:
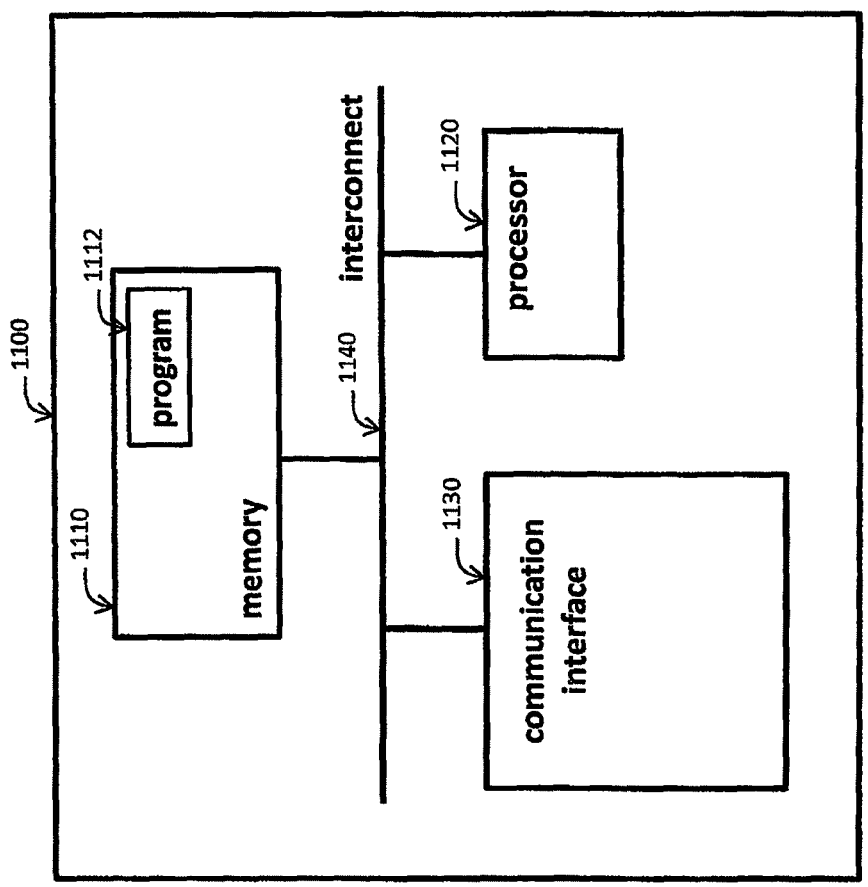
FIG. 11 is a block diagram of components of a computing apparatus or system in which various embodiments may be implemented or that may be utilized to execute embodiments.

FIG. 11 generally illustrates components of a computing device 1100 that may be utilized to execute embodiments and that includes a memory 1110, replenishment status program instructions 1112, a processor or controller 1120 to execute replenishment status program instructions 1112, a network or communications interface 1130, e.g., for communications with a network or interconnect 1140 between such components. The memory 1110 may be or include one or more of cache, RAM, ROM, SRAM, DRAM, RDRAM, EEPROM and other types of volatile or non-volatile memory capable of storing data. The processor unit 1120 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1140 may include a system bus, LDT, PCI, ISA, or other types of buses, and the communications or network interface may, for example, be an Ethernet interface, a Frame Relay interface, or other interface. The network interface 1130 may be configured to enable a system component to communicate with other system components across a network which may be a wireless or various other networks. It should be noted that one or more components of computing device 1100 may be located remotely and accessed via a network. Accordingly, the system configuration provided in FIG. 11 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1120 executes program instructions 1112 within memory 1110 and/or embodied on the carrier to implement method embodiments. Further, embodiments may reside and execute on a mobile communication device such as a cellular telephone or Smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are described with reference items in the form of goods, embodiments may also involve items in the form of commodities or both goods and commodities consumed by individuals and corporate and government entities.

As a further example, embodiments may involve a replenishment status program that is a stand alone program or that is part of another system or program, such as a financial management system that is in communication with merchant payment devices and/or financial institutions hosting merchant and customer accounts.

Further, electronic transaction data sent to host computer can be stored based on various types of purchase or sale including, but not limited to, credit card, debit card, check, electronic check, ATM withdrawal, ACH and other forms of electronic transactions. Receipt data that is sent to the host computer may also be generated as a result of cash purchases, and paper receipts can be scanned and processed for inclusion in the receipt database.

Moreover, while certain embodiments are described with reference to system components involving merchants and FIs, other embodiments may not involve such parties or associate data and instead may involve a user 230 accessing his or her own inventory data, however generated and received, and using a FMS such as QUICKBOOKS that embodies or utilizes a replenishment status program for real-time inventory and price monitoring, and determining whether to purchase inventory items.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, embodiments are intended to exemplify alternatives, modifications, and equivalents that may fall within the scope of the claims, and it is intended that the art disclosed shall be limited only to the extent required by the appended claims and the rules and principles of applicable law.

What is claimed is:

1. A computer-implemented method for notifying a user about replenishing an inventory item, the method comprising:
    receiving, at a computer, electronic data indicating a number of the inventory item purchased by a user in the past and electronic data indicating prior sales of the inventory item;
    determining, with the computer, a number of the inventory item on a current date based on the number of the inventory item purchased by the user in the past and the prior sales of the inventory item;
    predicting, with the computer, a number of the inventory item on a future date based at least in part upon the number of the inventory item on the current date and a rate of consumption of the inventory item determined based on the prior sales of the inventory item;
    determining, with the computer, a price trend for the inventory item and whether to purchase the inventory item on the current date based at least in part upon the predicted number of the inventory item, the rate of consumption of the inventory item, and the price trend for the inventory item; and
    displaying to the user an indicator of whether to purchase the inventory item on the current date or on a later date.

2. The method of claim 1, wherein the price trend for the inventory item is determined based on at least one of past prices of raw materials used to manufacture the inventory item, past retail prices of the inventory item, and past wholesale prices of the inventory item.

3. The method of claim 1, wherein determining whether to purchase the inventory item on the current date is additionally based on a sales trend for the inventory item.

4. The method of claim 3, wherein the sales trend for the inventory item is based at least in part upon past seasonal sales trends for the inventory item.

5. The method of claim 1, wherein the indicator includes instructions relating to one of buy the inventory item now, buy the inventory item later, and neutral regarding buying the inventory item.

6. The method of claim 1, wherein the indicator is sent to the user by an electronic message sent from the computer to at least one of a computing device and a mobile communication device.

7. The method of claim 1, wherein the indicator is displayed to the user by a real time display on at least one of a computing device and a mobile communication device.

8. The method of claim 1, wherein the indicator is at least one of a visual indicator and an auditory indicator.

9. The method of claim 1, wherein the method further comprises providing the user with a means to buy the inventory item.

10. The method of claim 9, wherein the means to buy the inventory item is an actionable link to buy the inventory item.

11. The method of claim 10, wherein the actionable link to buy the inventory item allows the user to purchase the inventory item directly from a merchant selling the inventory item.

12. The method of claim 10, wherein the actionable link to buy the inventory item allows the user to purchase the inventory item from a merchant selling the inventory item via a financial institution.

13. The method of claim 1, the electronic data indicating the number of the inventory item purchased by the user in the past being received from a financial management system associated with the computer.

14. The method of claim 13, the electronic data indicating the number of the inventory item purchased by the user in the past being received by the financial management system from a computer of a financial institution at which the user has an account.

15. The method of claim 1, the electronic data indicating prior sales of the inventory item being received from a financial management system associated with the computer.

16. The method of claim 15, the electronic data indicating prior sales of the inventory item being received by the financial management system from a computer of a financial institution at which the user has an account.

17. A computer program product comprising a non-transitory computer readable storage medium embodying one or more instructions executable by a computer to perform a process for notifying a user about replenishment status of an inventory item, the process comprising:
    receiving, at the computer, electronic data indicating a number of the inventory item purchased by the user in the past, and electronic data indicating prior sales of the inventory item;
    determining, with the computer, a number of the inventory item on a current date based on the number of the inventory item purchased by the user in the past and the prior sales of the inventory item;
    predicting, with the computer, a number of the inventory item on a future date based at least in part upon the number of the inventory item on the current date and a rate of consumption of the inventory item determined based on the prior sales of the inventory item;
    determining, with the computer, a price trend for the inventory item, and whether to purchase the inventory item on the current date based at least in part upon the predicted number of the inventory item, a rate of consumption of the inventory item, and the price trend for the inventory item; and
    displaying to the user an indicator of whether to purchase the inventory item on the current date or on a later date.

18. A system for notifying a user about a replenishment status of an inventory item, the system comprising:
    an intermediate computer operably coupled to a source of inventory item data through a first network and operably coupled to a computing device of a user through a second network; and
    replenishment status program executing on or accessible by the intermediate computer, the replenishment status program being configured to receive electronic data indicating a number of the inventory item purchased by the user in the past; to receive electronic data indicating prior sales of the inventory item; to determine a number of the inventory item on a current date based on the number of the inventory item purchased by the user in the past and the prior sales of the inventory item; to predict a number of the inventory item on a future date based at least in part upon the number of the inventory item on the current date and a rate of consumption of the inventory item determined based on the prior sales of the inventory item; to determine a price trend for the inventory item; to determine whether to purchase the inventory item on the current date based at least in part upon the predicted number of the inventory item, a rate of consumption of the inventory item, and the price trend for the inventory item; and to display to the user an indicator of whether to purchase the inventory item on the current date or on a later date.

* * * * *